US011438179B2

(12) United States Patent
Tripathi

(10) Patent No.: US 11,438,179 B2
(45) Date of Patent: Sep. 6, 2022

(54) CERTIFICATE RENEWAL PROCESS OUTSIDE APPLICATION SERVER ENVIRONMENT

(71) Applicant: Kyndryl, Inc., New York, NY (US)

(72) Inventor: Priyanka Tripathi, Bangalore (IN)

(73) Assignee: Kyndryl, Inc., New York, NY (US)

( * ) Notice: Subject to any disclaimer, the term of this patent is extended or adjusted under 35 U.S.C. 154(b) by 186 days.

(21) Appl. No.: 16/876,664

(22) Filed: May 18, 2020

(65) Prior Publication Data

US 2021/0359865 A1 Nov. 18, 2021

(51) Int. Cl.
*H04L 9/32* (2006.01)
*H04L 9/40* (2022.01)
*H04L 9/08* (2006.01)

(52) U.S. Cl.
CPC .......... *H04L 9/3263* (2013.01); *H04L 9/0819* (2013.01); *H04L 63/0428* (2013.01); *H04L 63/0823* (2013.01)

(58) Field of Classification Search
None
See application file for complete search history.

(56) References Cited

U.S. PATENT DOCUMENTS

| 2005/0071630 | A1* | 3/2005 | Thornton | H04L 9/3271 713/156 |
| 2015/0222604 | A1* | 8/2015 | Ylonen | H04L 9/083 713/171 |
| 2017/0171191 | A1 | 6/2017 | Cignetti et al. | |
| 2017/0295152 | A1 | 10/2017 | Schiefelbein | |
| 2018/0034646 | A1* | 2/2018 | Kuramoto | H04L 9/3268 |
| 2018/0077128 | A1 | 3/2018 | Kundu et al. | |

FOREIGN PATENT DOCUMENTS

CN 103001965 A 3/2013

* cited by examiner

*Primary Examiner* — Brandon Hoffman
(74) *Attorney, Agent, or Firm* — Scully, Scott, Murphy & Presser, PC; Ken Han, Esq.

(57) ABSTRACT

A computer-implemented method, a system, and a computer program product for renewing a digital certificate. According to an embodiment of the present invention, the computer-implemented method comprises copying a digital certificate, from a first computer, onto a second computer, and requesting, from the second computer, renewal of the digital certificate by a certificate authority. The method further comprises loading a renewed digital certificate from the certificate authority, and saving the renewed digital certificate on the second computer. The renewed digital certificate is checked, on the second computer, for specified conditions, and the renewed digital certificate is copied from the second computer onto the first computer.

18 Claims, 7 Drawing Sheets

CERTIFICATE RENEWAL PROCESS OUTSIDE APPLICATION SERVER ENVIRONMENT

BACKGROUND

This invention generally relates to communication security, and more specifically, to renewing digital certificates.

SUMMARY

According to an embodiment of the present invention, a method comprises copying a digital certificate, from a first computer, onto a second computer; requesting, from the second computer, renewal of the digital certificate by a certificate authority; loading a renewed digital certificate from the certificate authority; saving the renewed digital certificate on the second computer; checking the renewed digital certificate, on the second computer, for specified conditions; and copying the renewed digital certificate from the second computer onto the first computer.

Obtaining and managing SSL certificates is a time-consuming and resource-consuming process. As examples, there are two scenarios where a certificate renewal becomes a tedious job: Manual error; and Infrastructure access.

Embodiments of the invention renew the certificate outside of an application server environment. The above problems can be addressed if the certificate renewal process is started outside the Application Server Environment.

In embodiments of the invention, the following are the major steps for renewing the certificate outside the Application Server environment: Copy Key Database file(.jks, .kdb etc) from the Application Server machine to another machine; Request for a certificate; After certificate is approved, add the approved certificate to the KeyStore file; Check the certificate details; Transfer the KeyStore file to the Application Server machine and overwrite the KeyStore file there.

DETAILED DESCRIPTION

Figure 1:
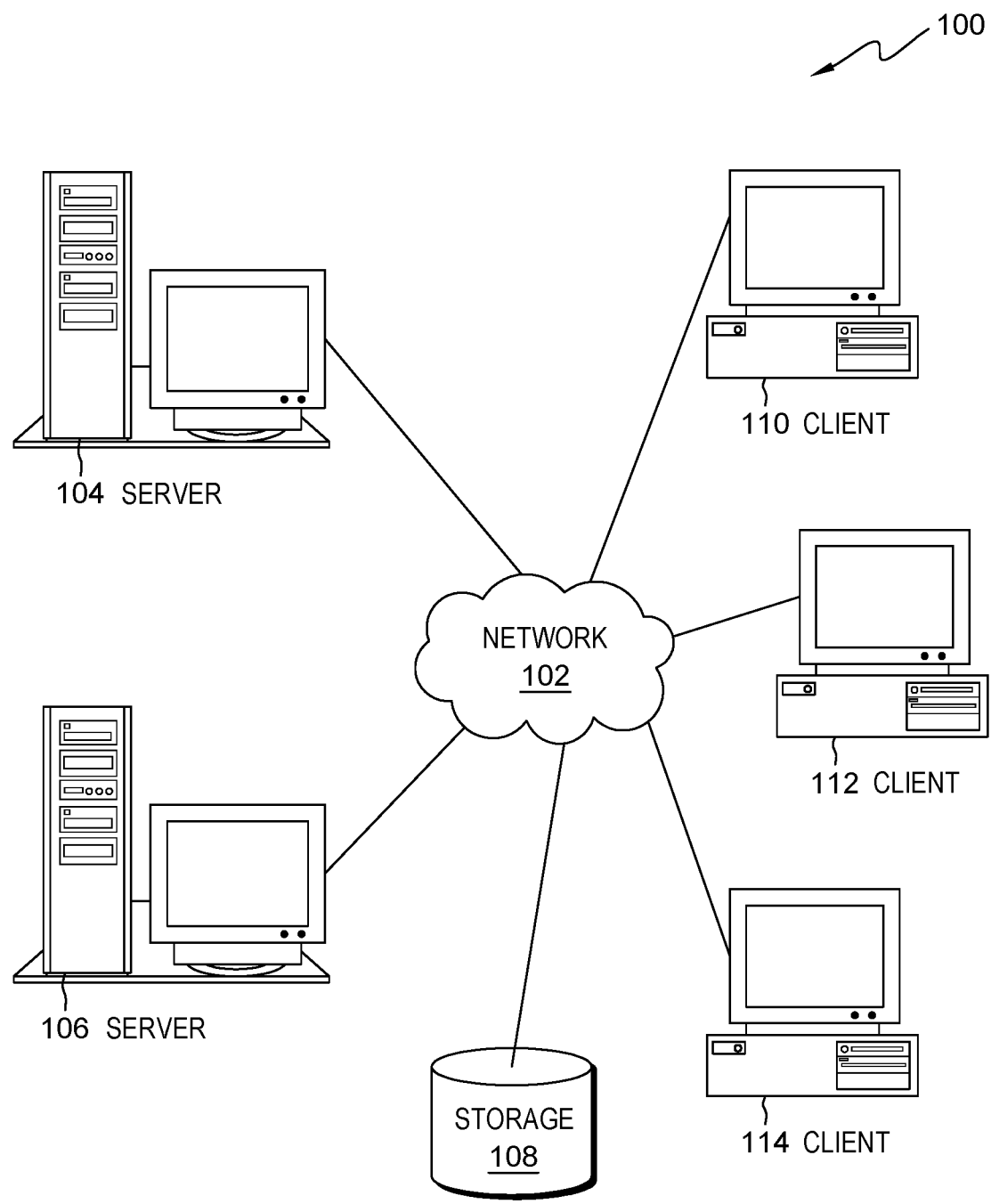
FIG. 1 depicts a pictorial representation of a network environment in which embodiments of the invention may be implemented.

A digital certificate, commonly referred to as a certificate, is an electronic document used to identify an individual, a server, a company, or another type of entity and to associate that identity with a public key. Certificates have the purpose of establishing trust. Their usage varies depending on the kind of trust they are used to ensure.

Certificates are issued by Certificate Authorities (CAs). Certificate authorities are entities that validate identities and issue certificates. Clients and servers use certificates issued by the CA to determine the other certificates that can be trusted. The methods used to validate an identity can vary depending on the policies of a given CA. In general, before issuing a certificate, the CA must use its published verification procedures for that type of certificate to ensure that an entity requesting a certificate is, in fact, who it claims to be.

A CA issues a certificate, encrypted with the CA's private key, to a requesting server after the CA has taken measures to verify the identity of the server or administrator(s) of the server. A server may be a website, website operator, or any other service or network entity desiring to provide some level of assurance of its identity.

The certificate issued by the CA binds a particular public key to the name of the entity that the certificate identifies; for example, the name of an employee or a server. Certificates help to prevent the use of false public keys for impersonation. Only the public key that is certified by the certificate will work with the corresponding private key that is owned by the entity identified by the certificate.

In addition to a public key, a certificate also includes the name of the entity it identifies, an expiration date, the name of the CA that issued the certificate, a serial number, and other information. A certificate also includes the digital signature of the issuing CA. The CA digital signature allows the certificate to function as a letter of introduction for users who know and trust the CA, but do not know the entity that is identified by the certificate.

One type of certificate is a Secure Socket Layer (SSL) certificate. SSL is a cryptographic protocol that provides communication security over the Internet. SSL is often used to establish a secure connection over which a client and a server may exchange sensitive information such as usernames, passwords, social security numbers, credit card numbers and other financial information, or the like.

SSL employs the use of asymmetric keys, which are defined in pairs of public and private keys. A key is a piece of information that is applied utilizing an algorithm to a string or block of unencrypted information to produce encrypted information, or to decrypt encrypted information. A public key is made freely available to anybody. A private key is known only to the server. Information encrypted by the client using the public key can be decrypted only by the server's private key. Also, data encrypted by the server's private key can only be decrypted using the public key.

An SSL certificate is a digital computer file that utilizes a digital signature to bind a public key with an identity of a person or organization that owns a Web site or other resource. An SSL certificate may contain, in addition to the public key, information about the owner such as a domain name, server name, hostname, company name, company location, duration of validity, certificate usage, distinguished name, and/or common name. An SSL certificate may also include information about the certificate authority ("CA") that issued the certificate.

Certificates often operate in a time-based paradigm or model, under which a certificate is not perpetually valid, but instead has an expiration after which it is no longer valid. Certificate renewal is a well-known, and wide-sweeping issue in network security. Current protocols and approaches for certificate renewal are often complex and difficult to build and use.

Certificate renewals may happen at regular intervals when a certificate expires. The process to reinstall the certificate often requires special expertise, requiring many man hours to perform. Current schemes and protocols used to ease the burden of installation and configuration are often bulky and difficult to build, and can therefore be especially error-prone. Such circumstances may result in weakening of the overall security of the network.

Certificate renewal is an important task and extra precaution should be taken to backup the existing setup, else the renewal process can corrupt the existing SSL configuration.

Certificate renewals may be particularly error-prone and result in significant loss of man hours when the certificate is for an enterprise application server hosted on multiple virtual servers.

As examples, there are two scenarios where a certificate renewal becomes a tedious job:
  a. Manual error—Where a person who is renewing a certificate forgets to take backup of key databases or is new to certificate configuration work and not aware that backup should be taken. This can lead to a situation of having a corrupted key database in case of no backup.
  b. Infrastructure access—In a product support environment where many teams work together to provide support for a product, each team will have write/execute access to only their own components and will not have access to other components. For example, a database/Management team will not have access to middleware files on certain machines. So, in a scenario where a certificate is expired, it becomes a tedious and costly affair to involve a resource for just renewing the certificate. Sometimes it may take more time to allocate a resource.

In embodiments of the invention, these and other problems are addressed by starting the certificate renewal process outside the application server environment.

Figure 2:
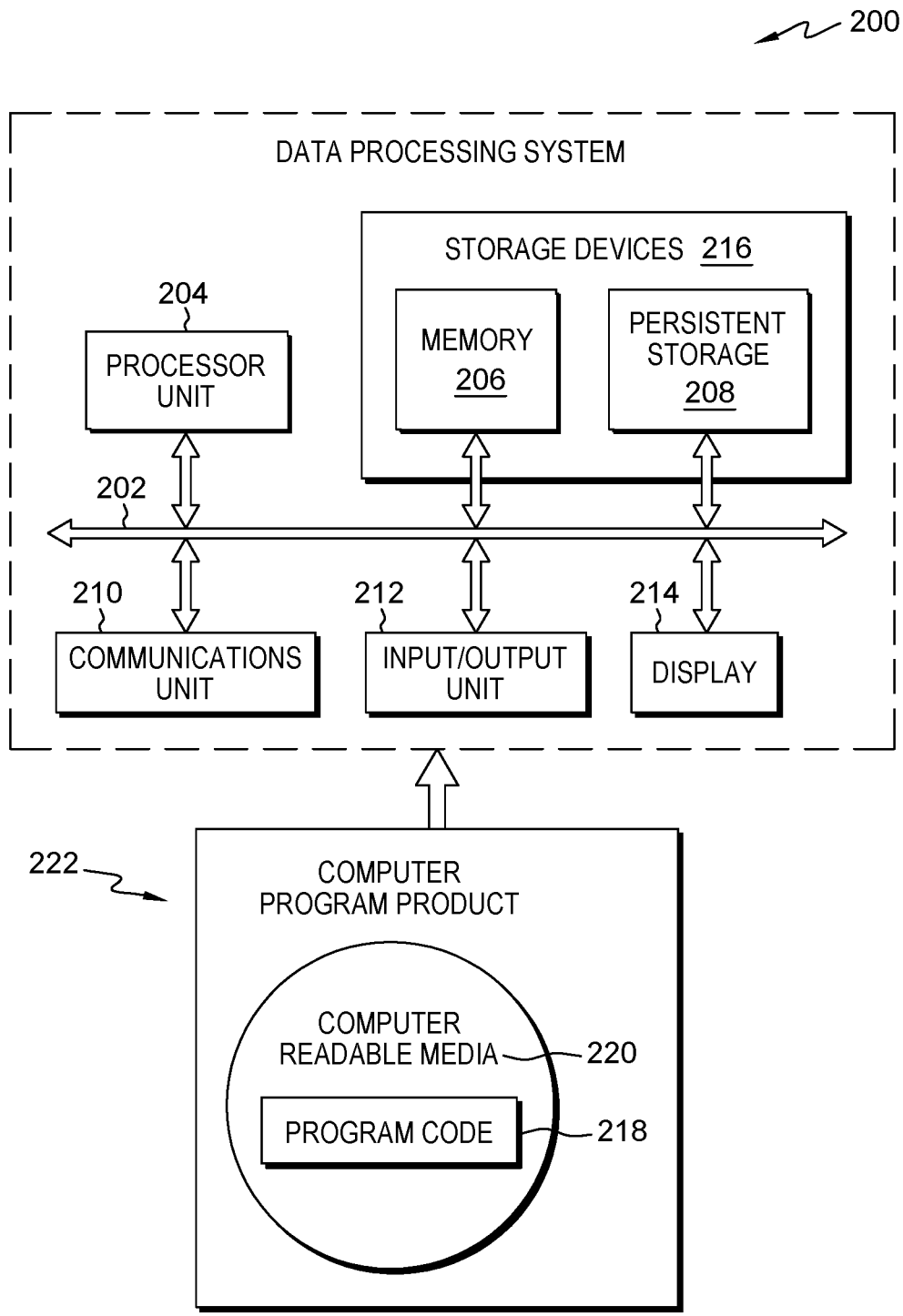
FIG. 2 is a block diagram of a data processing system that may be used in embodiments of the invention.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a diagram illustrating an exemplary network environment 100 that may be used in or with embodiments of the invention. Network environment 100 includes network 102, servers 104, 106, storage unit 108, and client devices 110, 112 and 114. Network 102 is the medium used to provide communication links between various devices and computers within network environment 100, and network 102 may include connections, such as wire, wireless communication links, or fiber optic cables, for connecting the components of network environment 100. Network environment 100 may include additional servers, clients, and other devices not shown.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example.

Program code located in network environment 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network 102 is the Internet, representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. As will be understood by those of ordinary skill in the art, network 102 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system 200 is shown. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form a computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
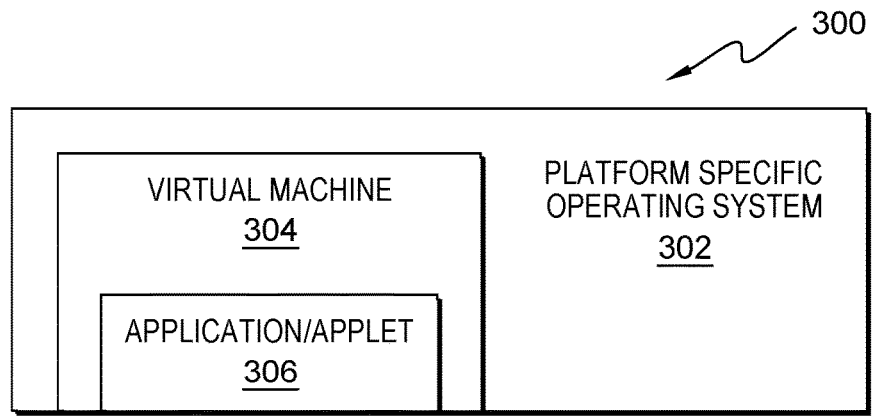
FIG. 3 is a block diagram illustrating the relationship of software components operating within a computer system that may be used in embodiments of the invention.

With reference now to FIG. 3, a block diagram illustrates the relationship of software components operating within a computer system that may be used with or in the implementation of the present invention. Java® based system 300 contains platform specific operating system 302 that provides hardware and system support to software executing on a specific hardware platform. Virtual machine (VM) 304 is one software application that may execute in conjunction with the operating system. Virtual machine 304 provides a run-time environment with the ability to execute application/applet 306, which is a program, servlet, or software component. The computer system in which virtual machine 304 operates may be similar to data processing system 200 or computer 100 described above. However, virtual machine 304 may be implemented in dedicated hardware.

Figure 4:
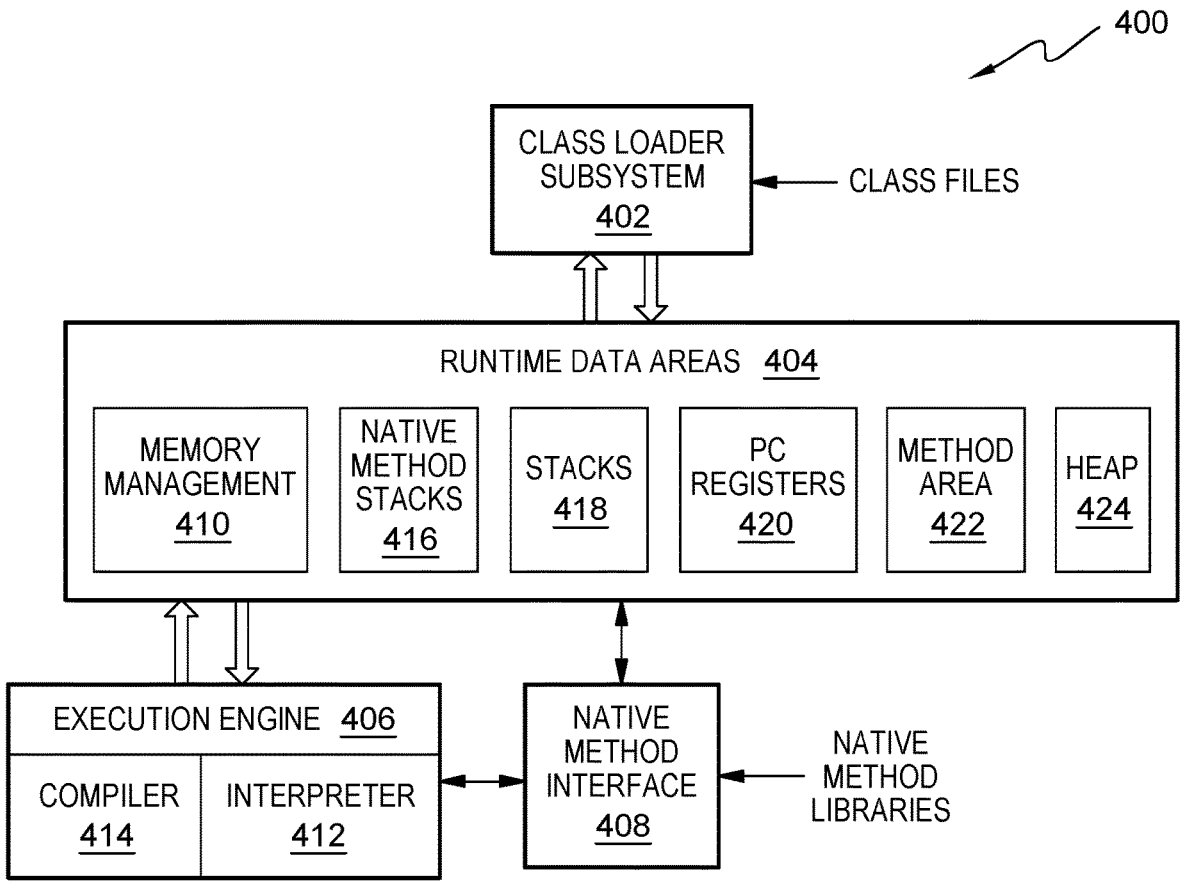
FIG. 4 is a block diagram of a virtual machine that may be used in embodiments of the invention.

With reference now to FIG. 4, a block diagram of a virtual machine is depicted in accordance with a illustrative embodiment. Virtual machine (VM) 400 includes class loader subsystem 402, which is a mechanism for loading types, such as classes and interfaces, given fully qualified names. Virtual machine 400 also contains runtime data areas 404, execution engine 406, native method interface 408, and memory management 410. Execution engine 406 is a mechanism for executing instructions contained in the methods of classes loaded by class loader subsystem 402. Execution engine 406 may be, for example, interpreter 412 or just-in-time compiler 414. Native method interface 408 allows access to resources in the underlying operating system. Runtime data areas 404 contain native method stacks 416, stacks 418, PC registers 420, method area 422, and heap 424. These different data areas represent the organization of memory needed by virtual machine 400 to execute a program.

Figure 5:
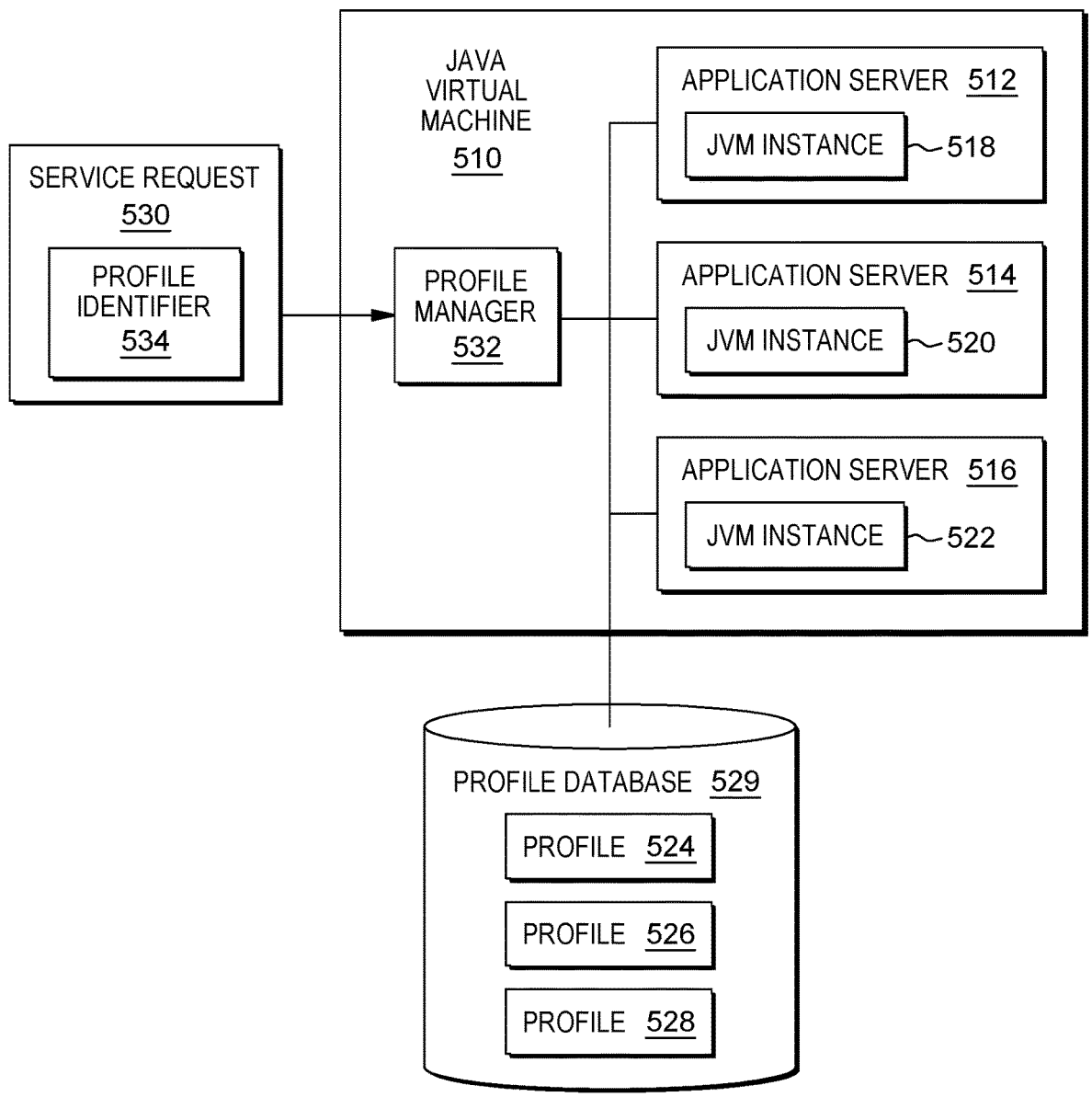
FIG. 5 is a dataflow diagram for provisioning profiles to a virtual machine of a data processing system.

Referring now to FIG. 5, a known dataflow diagram for provisioning profiles to a virtual machine of a data processing system is depicted. Virtual machine 510 is, for example, virtual machine 400 of FIG. 4. Virtual machine 510 installs and maintains different versions of the Enterprise application server in separate profiles of the same machine by maintaining complete installations for each of the separate profiles. Virtual machine 510 contains application servers 512-516. Application servers 512-516 are the primary runtime component where applications of Java® virtual machine 510 actually execute.

Each of application servers 512-516 executes one of virtual machine instances 518-522. Virtual machine instances 518-522 are class instances within virtual machine 510. Several of virtual machine instances 518-522 can separately execute within virtual machine 510, so long as those instances are each contained within a separate application server, such as application servers 512-516.

Virtual machine instances 518-522 are created using one of profiles 524-528, stored in profile database 530. Profile database 529 is a data structure implemented on a storage unit, such as storage unit 108 of FIG. 1, that contains or references the location of profiles 524-528. Profiles 524-528 are separate data partitions that include the files that define a runtime environment for an application server process, such as a deployment manager or an application server. Each runtime environment has its own configuration files, logs, properties, and other attributes. Profiles 524-528 can make each runtime of application servers 512-516 unique and separate from the server binaries and from other profiles.

When virtual machine 510 receives service request 530, profile manager 532 recognizes profile identifier 534. Profile identifier 534 is an indication of which version of the enterprise application server should be used to fulfill the request, and therefore which of profiles 524-528 should be utilized in creating a particular instance, such as one of virtual machine instances 518-522. Profile manager 532 then retrieves the indicated one of profiles 524-528, and allocates that retrieved profile to the particular one of application servers 512-516 that is executing the instance.

Figure 6:
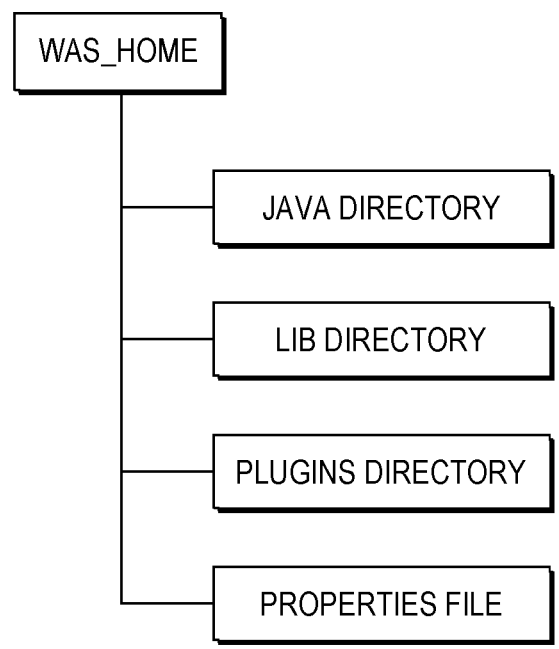
FIG. 6 is a block diagram that schematically illustrates an installation of an Enterprise application server file system structure that may be used in embodiments of the invention.

Referring now to FIG. 6, a block diagram that schematically illustrates an enterprise application server file system structure is shown according to the prior art. File structure 600 is an organization of the file system structure of the EAS so that a base version and multiple other complete installations of the runtime files can be kept in the enterprise application server home directory. File structure 600 is a schematic representation of a file system containing profiles, such as profiles 524-528 of FIG. 5.

File structure 600 includes a home directory 602. Home directory 602 can be, for example, but is not limited to the \WebSphere\AppServer WAS_HOME directory when the enterprise application server is a WebSphere® Application Server. Websphere® is a registered trademark of International Business Machines Corporation. The \profiles directory lists the various profiles, however, the other directories and files of WebSphere, for example, directory 604, lib directory 606, plugins directory 608 and properties file 610, are all at the WAS_HOME level.

Figure 7:
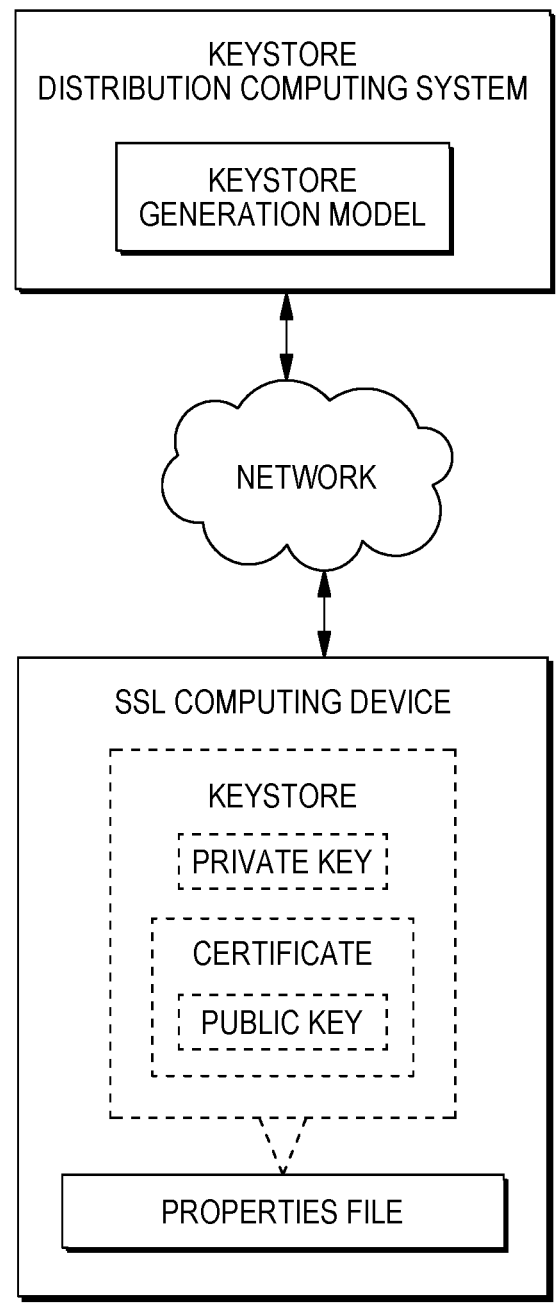
FIG. 7 illustrates a system for generating and storing SSL digital certificates.

One or more of the application servers has an SSL digital certificate to verify its identity and to help establish trusted relationships. FIG. 7 illustrates a system for generating and storing SSL digital certificates. The illustrated operating environment 700 includes an SSL computing device 702 that is configured to communicate with a distribution computing system (hereinafter "distribution system") 704 via a network 706 to obtain keystore files. A keystore (also referred to herein as a "keystore file") contains one or more private keys and one or more certificates that contain corresponding public keys for a computing device such as the SSL computing device 702.

The SSL computing device 702 may be configured to provide a Web site or other resource to one or more computing devices over the Internet. The individual or organization that owns the Web site or other resource may desire or be required to establish a secure channel over which to exchange information with other computing devices. As such, the SSL computing device 702 may request an SSL certificate from the distribution system 704 and may utilize the SSL certificate to establish an SSL channel over which to exchange information with other computing devices over the network 706 and/or another network.

The distribution system 704 may be a desktop computer, a laptop computer, a tablet computer, an ultraportable computer, or any other type of computing device configured to perform various operations, actions, and/or functions described herein as being performed by the distribution system 104. In some embodiments, the distribution system 704 is configured to operate as a server to provide keystore files and/or truststore files to the SSL computing device 702, which is configured to operate as a client. In the illustrated embodiment, the distribution system 704 is configured to execute a keystore generation module 108 to perform various operations, actions, and/or functions described herein. In other embodiments, however, a dedicated keystore distribution system is configured to execute the keystore generation module 708. The keystore generation module 708 is configured to generate one or more keystore files for the SSL computing device 702 upon request.

Obtaining and managing SSL certificates is a time-consuming and resource-consuming process. For instance, in preparation to deploy a server that will utilize SSL to create a secure communication channel over which to exchange sensitive information, the person or organization that desires to deploy the server may be required to request the ability to obtain an SSL certificate, create a public and private key pair, create a certificate signing request ("CSR") that contains information about the person or organization who is requesting the SSL certificate and the public key, send the CSR to a certificate authority that issues SSL certificates, and receive the SSL certificate with approval from the certificate authority.

The WebSphere Application Server uses the certificate (Personal, Signer, CA etc.) which resides in KeyStore to establish trust for SSL connection. For each certificate, there is a specified validity date. Expired certificates will tend to loosen SSL communication, so each certificate should be renewed before it expires. Certificate renewal is an important task and extra precaution should be taken to back up the existing setup, else the renewal process can corrupt the existing SSL configuration.

As discussed above, as examples, there are two scenarios where a certificate renewal becomes a tedious job: Manual error; and Infrastructure access.

When the certificate renewal process is started on the same machine where, for example, the WebSphere Application Server is installed, then because of the above-mentioned manual error possibility, there are chances of the certificate being corrupted. Also, as application or other teams will have read only or no access to WebSphere machines, there will be dependency on a middleware team for certificate renewal, and this can slow down the whole process, as allocating a WAS resource may take time. This will create a significant disruption in the live production environment and affect several services and many users. As expired certificates disrupt application to come up, the production system may remain down for several hours or days due to this issue.

When renewing a certificate, if a backup is not taken before renewal, then in case of certificate renewal misconfiguration, this can lead to corrupted SSL configuration. In such a case, it becomes a tedious and lengthy task to fix the issue and make the SSL configuration working. The after effects of fixing a corrupted SSL configuration can disrupt live production applications which can go down for several hours, affecting a number of users.

In a product support environment (maintenance phase of Software product) where different teams will have only read-only access to a WebSphere environment, there is 100% dependency on a WebSphere person for renewing the certificate, and sometimes ittakes time to allocate a WebSphere person just for renewing the certificate. A delay in certificate renewal can lead to disrupted live production applications, affecting many users and businesses.

Embodiments of the invention renew the certificate outside the WebSphere Application Server infrastructure.

In embodiments of the invention, the certificate is not processed on the WebSphere Application Server machine for renewal, but is processed on another suitable machine.

The above-discussed problems can be addressed if the certificate renewal process is started outside the WebSphere Application Server Environment.

When the certificate renewal is done outside the WebSphere Application Server Environment, there is no risk of the SSL configuration being corrupted, as the KeyStore is copied to another machine and from there certificate renewal is requested for Certificate Authority approval, and after the certificate renewal is signed by the Certificate Authority, the certificate is added to the copy of the KeyStore and then transferred to the WebSphere Application Server Environment.

In embodiments of the invention, a person who is not from the WebSphere team can copy the KeyStore file and transfer the copy to another machine. Then, the certificate renewal can be processed from there and later can be transferred to the WebSphere machine, overwriting the KeyStore on that machine. This way, there is no dependency on the WebSphere team for certificate renewal, or at least the new certificate can be initiated for Certificate Authority approval (as approval takes time) and later the renewal process can be taken over by the WebSphere team for further processing. This will save time in critical product support environment.

In embodiments of the invention, this method can minimize the chances of the existing SSL configuration being corrupted. There will be no manual error as there will not be any need to count on the task of whether backup of existing infrastructure is taken or not. The backup is anyways taken when the Keystore file is copied to another machine, leaving the main SSL configuration on the WebSphere machine unchanged. This way, chances of existing SSL configuration being corrupted is minimal. This, in addition, will make sure that there is no down time of the live production application because of a corrupted SSL configuration, saving business and giving end users uninterrupted service.

In a production support environment, where a quick fix is highly recommended, sometimes allocating a WebSphere person for this work may take time, leading to interrupted live production services for several hours which leads to unhappy customers. In embodiments of the invention, instead of waiting for a WebSphere person to be allocated for doing this work, another person (for example application team, etc.) can copy the required KeyStore file onto another machine and the certificate renewal process can be initiated from there. This will save time fixing the downtime of live applications.

Figure 8:
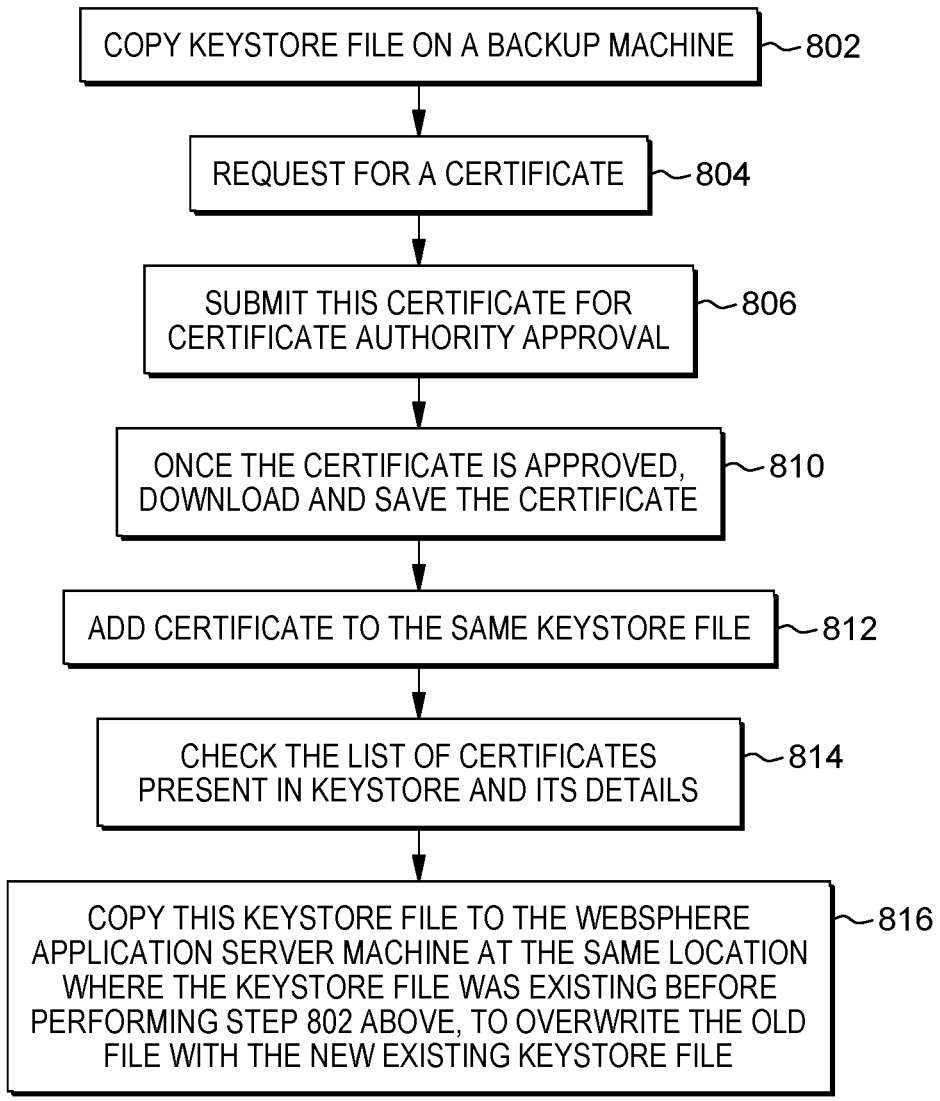
FIG. 8 shows a method for renewing a digital certificate outside an application server environment in accordance with an embodiment of the invention.

FIG. 8 illustrates a method in accordance with an embodiment of the invention. In embodiments, the steps of the method are performed to process the certificate for renewal from a machine outside the WebSphere Application Server environment:

Step 802 is to copy the KeyStore file onto a backup machine. This can be any suitable machine, and this machine is not necessarily where the application is deployed. This machine can be any suitable machine outside the production environment.

Step 804 is to request for a certificate. To do this, the user goes to the location where the KeyStore file is present, and creates a certificate request. Any suitable type of command, like openssl, keytool etc., can be used for creating the certificate request. (Commands can be any java commands, and below is the example of one existing command.)

```
gskcmd -certreq -create -db <jks_file.jks> -dn <domain_name> -size = 2048 -label
<label_name> -file <filename.csr> -pw <password>
```

This command is for reference only, and any other suitable java commands can also be used for performing the same operation.

Step 806 is to submit this certificate for Certificate Authority approval. Once the certificate is approved, step 810 is to download and save the certificate by some name, for example certfile.cer. Step 812 is to add the certificate to the same KeyStore file.

```
gskcmd -cert -receive -file <certfile.cer> -db <jks_file.jks> -pw <password>
```

This command is for reference only, and any other suitable java commands can also be used for performing the same operation.

Step 812 is to check the list of certificates present in KeyStore and details of each certificate, for example, by running the below commands (commands can be any suitable java commands, below are the example of existing commands):

```
Gskcmd -list -db <jks_file.jks> -pw <password>
Gskcmd -cert -details -db <jks_file.jks> -pw <password> -label <label_name>
```

These commands are for reference only, and any other suitable java commands can also be used for performing the same operation.

This will make sure that certificate is added successfully to the Keystore file and there is no error in the certificate.

Step 816 is to copy this KeyStore file to the WebSphere application server machine at the same location where the KeyStore file was existing before performing step 802 above, to overwrite the old file with the new KeyStore file.

This is how the certificate is successfully renewed outside WebSphere Application Server environment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A computer-implemented method comprising:
  copying a keystore file including a digital certificate, from a first computer, onto a second computer, said first computer comprising a web server hosting a plurality of web server applications and said digital certificate enabling secure encrypted communication between a web server application and a client browser;

requesting, from the second computer, renewal of the digital certificate by creating, by the second computer, a certificate renewal request and submitting, by the second computer, the certificate renewal request to a certificate authority;

loading a renewed digital certificate from the certificate authority;

saving the renewed digital certificate on the second computer including adding the renewed digital certificate to the copy of the keystore file on the second computer;

checking the renewed digital certificate, on the second computer, for specified conditions; and copying the renewed digital certificate from the second computer onto the first computer.

2. The method according to claim 1, wherein the copying a digital certificate, from a first computer, onto a second computer includes adding the copy of the digital certificate to a specified file on the second computer.

3. The method according to claim 2, wherein the saving the renewed digital certificate on the second computer includes adding the renewed digital certificate to the specified file on the second computer.

4. The method according to claim 3, wherein the copying the renewed digital certificate from the second computer onto the first computer includes copying the specified file from the second computer onto the first computer.

5. The method according to claim 4, wherein:

the copying a digital certificate, from a first computer, onto a second computer includes copying a defined file including the digital certificate, from the first computer, onto the second computer; and the copying the specified file from the second computer onto the first computer includes overwriting the defined file on the first computer with the copy of the specified file from the second computer.

6. The method according to claim 1, wherein the copying the renewed digital certificate from the second computer onto the first computer includes copying the renewed digital certificate from the second computer onto the first computer after the checking the renewed digital certificate, on the second computer, for specified conditions.

7. The method according to claim 1, wherein said digital certificate is a secure sockets layer (SSL) digital certificate associated with a SSL computing device.

8. The method according to claim 1, wherein said web application servers execute a virtual machine instance.

9. The method according to claim 7, wherein the keystore file comprising one or more private keys and one or more digital certificates that contain corresponding public keys for the SSL computing device.

10. A system comprising:

a system computer for copying a keystore file including a digital certificate, from another computer, onto the system computer, said another computer comprising a web server hosting a plurality of web server applications and said digital certificate enabling secure encrypted communication between a web server application and a client browser; requesting renewal of the digital certificate by creating, by the system computer, a certificate renewal request and submitting, by the system computer, the certificate renewal request to a certificate authority; loading a renewed digital certificate from the certificate authority; saving the renewed digital certificate including adding the renewed digital certificate to the copy of the keystore file on the system computer; checking the renewed digital certificate for specified conditions; and copying the renewed digital certificate onto the another computer.

11. The system according to claim 10, wherein the system computer adds the copy of the digital certificate to a specified file on the system computer.

12. The system according to claim 11, wherein the system computer adds the renewed digital certificate to the specified file on the system computer.

13. The system according to claim 10, wherein said digital certificate is a secure sockets layer (SSL) digital certificate associated with a SSL computing device.

14. The system according to claim 10, wherein said web application servers execute a virtual machine instance.

15. The system according to claim 13, wherein the keystore file comprising one or more private keys and one or more digital certificates that contain corresponding public keys for the SSL computing device.

16. A computer program product comprising a computer readable storage medium having program instructions embodied therewith, the program instructions executable by a processor to cause the processor to:

copy a keystore file including a digital certificate, from a first computer, onto a second computer, said first computer comprising a web server hosting a plurality of web server applications and said digital certificate enabling secure encrypted communication between a web server application and a client browser;

request, from the second computer, renewal of the digital certificate by creating, by the second computer, a certificate renewal request and submitting, by the second computer, the certificate renewal request to a certificate authority;

load a renewed digital certificate from the certificate authority;

save the renewed digital certificate on the second computer including adding the renewed digital certificate to the copy of the keystore file on the second computer;

check the renewed digital certificate, on the second computer, for specified conditions; and copy the renewed digital certificate from the second computer onto the first computer.

17. The computer program product according to claim 16, wherein copying the digital certificate, from the first computer, onto the second computer includes adding the copy of the digital certificate to a specified file on the second computer.

18. The computer program product according to claim 17, wherein saving the renewed digital certificate on the second computer includes adding the renewed digital certificate to the specified file on the second computer.

* * * * *